United States Patent
Nangia et al.

(10) Patent No.: US 11,849,411 B2
(45) Date of Patent: *Dec. 19, 2023

(54) DETERMINING SYNCHRONIZATION SIGNAL BLOCK POSITIONS

(71) Applicant: Motorola Mobility LLC, Chicago, IL (US)

(72) Inventors: Vijay Nangia, Woodridge, IL (US); Hyejung Jung, Palatine, IL (US); Robert Tristan Love, Barrington, IL (US)

(73) Assignee: Lenovo (Singapore) PTE. LTD., Singapore (SG)

( * ) Notice: Subject to any disclaimer, the term of this patent is extended or adjusted under 35 U.S.C. 154(b) by 621 days.

This patent is subject to a terminal disclaimer.

(21) Appl. No.: 16/875,718

(22) Filed: May 15, 2020

(65) Prior Publication Data

US 2020/0383071 A1 Dec. 3, 2020

Related U.S. Application Data

(63) Continuation of application No. 16/056,247, filed on Aug. 6, 2018, now Pat. No. 10,694,480.

(Continued)

(51) Int. Cl.
*H04W 56/00* (2009.01)
*H04W 72/23* (2023.01)
(Continued)

(52) U.S. Cl.
CPC ..... *H04W 56/001* (2013.01); *H04W 56/0015* (2013.01); *H04W 72/23* (2023.01); *H04W 72/30* (2023.01); *H04W 76/27* (2018.02)

(58) Field of Classification Search
CPC .............. H04W 56/001; H04W 76/27; H04W 56/0015; H04W 72/005; H04W 72/1289
See application file for complete search history.

(56) References Cited

U.S. PATENT DOCUMENTS

| 9,591,649 B1 | 3/2017 | Liu et al. |
| 10,694,480 B2 * | 6/2020 | Nangia ............. H04W 56/0015 |

(Continued)

FOREIGN PATENT DOCUMENTS

| CN | 104519576 | 4/2015 |
| CN | 105934900 | 9/2016 |

(Continued)

OTHER PUBLICATIONS

U.S. Appl. No. 16/915,997, "Notice of Allowance", U.S. Appl. No. 16/915,997, dated Aug. 22, 2022, 13 pages.

(Continued)

*Primary Examiner* — Siming Liu
(74) *Attorney, Agent, or Firm* — FIG. 1 Patents

(57) ABSTRACT

Techniques described herein determine positioning of synchronization signal blocks. One or more implementations receive at least one synchronization signal in a synchronization signal block from a first network entity, and an indication from a second network entity. The indication from the second network entity can be used to determine synchronization signal block positioning, such as time location (s). In turn, various implementations communicate with the first network entity based, at least in part, on the determined synchronization signal block(s).

20 Claims, 7 Drawing Sheets

Related U.S. Application Data

(60) Provisional application No. 62/544,752, filed on Aug. 11, 2017.

(51) Int. Cl.
 *H04W 72/30* (2023.01)
 *H04W 76/27* (2018.01)

(56) References Cited

U.S. PATENT DOCUMENTS

| | | | |
|---|---|---|---|
| 10,736,147 | B2 | 8/2020 | Jung et al. |
| 10,813,097 | B2 | 10/2020 | Islam et al. |
| 10,820,225 | B2 | 10/2020 | Jung et al. |
| 10,873,975 | B2 | 12/2020 | Freda et al. |
| 10,993,174 | B2 | 4/2021 | Ohara et al. |
| 11,147,000 | B2 | 10/2021 | Yiu et al. |
| 11,159,224 | B2 | 10/2021 | Gao et al. |
| 11,540,325 | B2 | 12/2022 | Jung et al. |
| 2007/0217440 | A1 | 9/2007 | Cho et al. |
| 2010/0120424 | A1 | 5/2010 | Johansson et al. |
| 2013/0044692 | A1 | 2/2013 | Nory et al. |
| 2013/0155990 | A1 | 6/2013 | Nishio et al. |
| 2013/0343318 | A1 | 12/2013 | Gruet et al. |
| 2014/0031031 | A1 | 1/2014 | Gauvreau et al. |
| 2014/0073372 | A1 | 3/2014 | Lee et al. |
| 2014/0301305 | A1 | 10/2014 | Xu et al. |
| 2015/0372851 | A1 | 12/2015 | Kakishima et al. |
| 2017/0251460 | A1 | 8/2017 | Agiwal et al. |
| 2017/0367069 | A1 | 12/2017 | Agiwal et al. |
| 2018/0034599 | A1 | 2/2018 | Zhou et al. |
| 2018/0054289 | A1 | 2/2018 | Kim et al. |
| 2018/0115943 | A1 | 4/2018 | Park et al. |
| 2018/0115996 | A1 | 4/2018 | Si et al. |
| 2018/0131489 | A1 | 5/2018 | Ly et al. |
| 2018/0167946 | A1 | 6/2018 | Si et al. |
| 2018/0176065 | A1 | 6/2018 | Deng et al. |
| 2018/0184391 | A1 | 6/2018 | Ly et al. |
| 2018/0198664 | A1 | 7/2018 | Lee et al. |
| 2018/0199363 | A1 | 7/2018 | Lee et al. |
| 2018/0205585 | A1 | 7/2018 | Sadiq et al. |
| 2018/0206272 | A1 | 7/2018 | Maaref et al. |
| 2018/0219606 | A1 | 8/2018 | Ng et al. |
| 2018/0227866 | A1 | 8/2018 | Jung et al. |
| 2018/0248642 | A1 | 8/2018 | Si et al. |
| 2018/0269939 | A1 | 9/2018 | Hu et al. |
| 2018/0279262 | A1 | 9/2018 | Babaei et al. |
| 2018/0279380 | A1 | 9/2018 | Jung et al. |
| 2019/0053174 | A1 | 2/2019 | Nangia et al. |
| 2019/0159165 | A1 | 5/2019 | Agiwal et al. |
| 2019/0349960 | A1 | 11/2019 | Li et al. |
| 2019/0357303 | A1 | 11/2019 | Xiong et al. |
| 2020/0014453 | A1 | 1/2020 | Takeda et al. |
| 2020/0112993 | A1 | 4/2020 | Tsai et al. |
| 2020/0337091 | A1 | 10/2020 | Jung et al. |
| 2020/0404617 | A1 | 12/2020 | Murray et al. |
| 2021/0058947 | A1 | 2/2021 | Lin |
| 2021/0212005 | A1 | 7/2021 | Jung et al. |
| 2021/0219345 | A1 | 7/2021 | Agiwal et al. |
| 2023/0082436 | A1 | 3/2023 | Jung et al. |

FOREIGN PATENT DOCUMENTS

| | | |
|---|---|---|
| CN | 106793058 | 5/2017 |
| CN | 106850165 | 6/2017 |
| ES | 2610789 | 5/2017 |
| WO | WO-2017022902 | 2/2017 |
| WO | 2018045307 A1 | 3/2018 |
| WO | WO-2018231003 | 12/2018 |

OTHER PUBLICATIONS

U.S. Appl. No. 17/205,987, "Restriction Requirement", U.S. Appl. No. 17/205,987, dated Oct. 6, 2022, 6 pages.
20197022719, "Foreign Office Action", KR Application No. 20197022719, dated Aug. 30, 2022, 5 pages.
Catt, "NR SS Periodicity", 3GPP TSG RAN WG1 NR Ad hoc Meeting, R1-1700180, Spokane, WA, USA [retrieved Sep. 9, 20220]. Retrieved from the Internet <https://www.3gpp.org/ftp/tsg_ran/wg1_rL1/TSGR1_AH/NR_AH_1701/Docs/>, Jan. 2017, 4 pages.
"Foreign Intention to Grant", EP Application No. 18707183, dated Jan. 24, 2022, 8 pages.
"First Search", CN Application No. 201880050804, dated Sep. 27, 2021, 1 page.
"Final Office Action", U.S. Appl. No. 15/890,112, dated Oct. 30, 2020, 21 pages.
"Foreign Office Action", EP Application No. 18762426.7, dated Mar. 11, 2021, 3 pages.
"Notice of Allowance", U.S. Appl. No. 15/890,112, dated Mar. 16, 2021, 13 pages.
"NR PBCH Design", 3GPP TSG RAN WG1 NR Ad-Hoc Meeting—R1-1700460 Spokane, USA—https://portal.3gpp.org/ngppapp/CreateTdoc.aspx?mode=view&contributionId=755092, Jan. 2017, 10 pages.
"Notice of Allowance", U.S. Appl. No. 15/935,947, dated Mar. 26, 2020, 10 pages.
"International Preliminary Report on Patentability", Application No. PCT/US2018/024362, dated Sep. 24, 2019, 10 pages.
"Evolved Universal Terrestrial Radio Access (E-UTRA); Medium Access Control (MAC) protocol specification (Release 14)", 3rd Generation Partnership Project; Technical Specification Group Radio Access Network; http://www.3gpp.org/ftp//Specs/archive/36_series/36.321/, Mar. 2017, 106 pages.
"International Search Report and Written Opinion", Application No. PCT/US2018/017096, dated May 17, 2018, 11 pages.
"International Search Report and Written Opinion", Application No. PCT/US2018/024362, dated Jun. 20, 2018, 12 pages.
"Non-Final Office Action", U.S. Appl. No. 15/935,947, dated May 15, 2019, 13 pages.
"International Search Report and Written Opinion", Application No. PCT/US2018/045662, dated Nov. 6, 2018, 13 pages.
"Final Office Action", U.S. Appl. No. 15/935,947, dated Jan. 7, 2020, 16 pages.
"Non-Final Office Action", U.S. Appl. No. 16/056,247, dated Jul. 25, 2019, 19 pages.
"Supplemental Notice of Allowability", U.S. Appl. No. 16/056,247, dated May 28, 2020, 2 pages.
"Final Office Action", U.S. Appl. No. 15/890,112, dated Nov. 18, 2019, 21 pages.
"Non-Final Office Action", U.S. Appl. No. 15/890,112, dated Apr. 16, 2020, 32 pages.
"On the maximum carrier bandwidth and multiple carriers operation", 3GPP TSG RAN WG1 NR Ad Hoc Meeting R1-1700006 Spokane, USA, https://portal.3gpp.org/ngppapp/CreateTdoc.aspx?mode=view&contributionId=753805, Jan. 2017, 6 pages.
"Numerology and Structure for NR Synchronization Signal", 3GPP TSG RAN WG1 Meeting #88—R1-1703043 Athens, Greece—https://portal.3gpp.org/ngppapp/CreateTdoc.aspx?mode=view&contributionId=764438, Feb. 2017, 6 pages.
"Discussion on SS block composition and SS burst set composition", 3GPP TSG RAN WG1 Meeting #89 R1-1708161 Hangzhou, China—Retrieved at https://portal.3gpp.org/ngppapp/CreateTdoc.aspx?mode=view&contributionId=787866, May 2017, 6 pages.
"Frequency location of the synchronization signals", 3GPP TSG RAN WG1 NR Ad Hoc Meeting—R1-1700038 Spokane, USA https://portal.3gpp.org/ngppapp/CreateTdoc.aspx?mode=view&contributionId=753837, Jan. 2017, 7 pages.
"NR four-step random access procedure", Ericsson—3GPP TSG-RAN WG1 Meeting #88, R1-1702128—http://www.3gpp.org/DynaReport/TDocExMtg--R1-88-17053.htm, Feb. 2017, 7 pages.
"Discussion on SS burst set composition", 3GPP TSG RAN WG1 Meeting NR#2—R1-1710259 Qingdao, P.R. China—Retrieved at https://portal.3gpp.org/ngppapp/CreateTdoc.aspx?mode=view&contributionId=799970, Jun. 2017, 7 pages.

(56) References Cited

OTHER PUBLICATIONS

"Timing indication based on SS block", 3GPP TSG-RAN WG1 NR Ad-Hoc#2—R1-1711373 Qingdao, P.R. China—Retrieved at https://portal.3gpp.org/ngppapp/CreateTdoc.aspx?mode=view&contributionId=802044, Jun. 2017, 7 pages.
"Notice of Allowance", U.S. Appl. No. 16/056,247, dated Feb. 11, 2020, 8 pages.
"Non-Final Office Action", U.S. Appl. No. 16/056,247, dated Sep. 20, 2019, 8 pages.
"International Preliminary Reporton Patentability", Application No. PCT/US2018/045662, dated Feb. 11, 2020, 9 pages.
"Discussion on SS burst set composition and SS block time index indication", 3GPP TSG RAN WG1 Meeting #88bis R1-1705052 Spokane, USA—Retrieved at https://portal.3gpp.org/ngppapp/CreateTdoc.aspx?mode=view&contributionId=776050, Apr. 2017, 9 pages.
"International Preliminary Report on Patentability", Application No. PCT/US2018/017096, dated Aug. 15, 2019, 9 pages.
"Random access in NR", ZTE Corporation, ZTE Microelectronics—http://www.3gpp.org/DynaReport/TDocExMtg--R2-96-31671.htm, Nov. 2016, 9 pages.
Jung, "Transmitting and Receiving a Synchronization Signal Block", U.S. Appl. No. 15/890,112, filed Feb. 6, 2018, 42 pages.
Jung, "Method and Apparatus for Receiving Physical Downlink Shared Channel Including a Random Access Response Message", U.S. Appl. No. 15/935,947, filed Mar. 26, 2018, 45 pages.
"Foreign Office Action", CN Application No. 201880009935, dated Oct. 28, 2021, 20 pages.
"Foreign Office Action", CN Application No. 201880050804, dated Oct. 9, 2021, 22 pages.
"Foreign Office Action", KR Application No. 20197022719, dated Apr. 18, 2022, 8 pages.
"Foreign Office Action", EP Application No. 18718036, dated May 9, 2022, 6 pages.
U.S. Appl. No. 16/915,997, "Final Office Action", U.S. Appl. No. 16/915,997, dated Jun. 9, 2022, 21 pages.
201880009935 , "Foreign Office Action", CN Application No. 201880009935, dated Jun. 16, 2022, 11 pages.
20197022719 , "Written Decision on Registration", KR Application No. 20197022719, dated Jan. 5, 2023, 6 pages.
22170258 , "Extended European Search Report", EP Application No. 22170258, dated Nov. 16, 2022, 11 pages.
Intel Corporation , "Periodicity of synchronization signals", 3GPP TSG RAN WG1 AH_NR Meeting, R1-1700329, Spokane, USA [retrieved Jan. 12, 2023]. Retrieved from the Internet <https://www.3gpp.org/ftp/tsg ran/WG1_RL1/TSGR1_AH/NR_AH_1701/Docs/>., Jan. 2017, 4 Pages.
Zte , et al., "NR-SS: Bandwidth, Multiplexing", 3GPP TSG RAN WG1 AH_NR Meeting, R1-1700097, Spokane, USA [retrieved Jan. 12, 2023]. Retrieved from the Internet <https://www.3gpp.org/ftp/TSG_RAN/WG1_RL1/TSGR1_AH/NR_AH_1701/Docs>., Jan. 2017, 10 Pages.
Zte , et al., "NR-SS: Periodicity", 3GPP TSG RAN WG1 AH_NR Meeting, R1-1700099, Spokane, USA [retrieved Jan. 12, 2023]. Retrieved from the Internet <https://www.3gpp.org/ftp/tsg_ran/WG1_RL1/TSGR1_AH/NR_AH_1701/Docs/>., Jan. 2017, 6 Pages.
U.S. Appl. No. 17/205,987, "Final Office Action", U.S. Appl. No. 17/205,987, filed May 5, 2023, 14 pages.
Li, Qing , et al., "US Provisional Application as Filed", U.S. Appl. No. 62/443,497, filed Jan. 6, 2017, 83 pages.
Tsai, Allan Y, et al., "US Provisional Application as Filed", U.S. Appl. No. 62/453,855, filed Feb. 2, 2017, 74 pages.
10-2019-7027416 , "Foreign Office Action", KR Application No. 10-2019-7027416, dated Feb. 14, 2023, 15 pages.
U.S. Appl. No. 17/205,987, "Non-Final Office Action", U.S. Appl. No. 17/205,987, filed Jan. 12, 2023, 18 pages.
20207003585 , "Foreign Office Action", KR Application No. 20207003585, dated Jan. 30, 2023, 7 pages.
Lee, Heechoon , et al., "US Provisional Application as Filed", U.S. Appl. No. 62/444,132, filed Jan. 9, 2017, 35 pages.
Lee, Heechoon , et al., "US Provisional Application as Filed", U.S. Appl. No. 62/444,618, filed Jan. 10, 2017, 31 pages.
Murray, Joseph M, et al., "US Provisional Application as Filed", U.S. Appl. No. 62/453,880, filed Feb. 2, 2017, 9 pages.
Ng, Boon Loong, "US Provisional Application as Filed", U.S. Appl. No. 62/453,312, filed Feb. 1, 2017, 16 pages.

* cited by examiner

DETERMINING SYNCHRONIZATION SIGNAL BLOCK POSITIONS

RELATED APPLICATIONS

This application is a continuation of U.S. patent application Ser. No. 16/056,247, filed Aug. 6, 2018, the disclosure of which is hereby incorporated by reference herein in its entirety. U.S. patent application Ser. No. 16/056,247 claims priority to U.S. Provisional Application No. 62/544,752, filed Aug. 11, 2017, the disclosure of which is hereby incorporated by reference herein in its entirety.

BACKGROUND

As computing devices continue to add wireless capabilities, the demand for support from corresponding Network Entities (NE), such as a base station or evolved Node B (eNodeB), increases as well. To support increased usage, some wireless systems employ multi-beam antennas to increase transmission capacity using a same spectrum. As User Equipment (UE) moves within range of transmissions from the NE, the UE can extract information that is subsequently used to connect with the NE. For example, NEs transmit Synchronization Signals (SS) to synchronize communications with User Equipment (UE). In turn, UEs receive and process SS data to obtain connection information that can be used to establish a new connection to a wireless network, or maintain an existing one. The advancement of wireless networks to multi-beam antenna systems can add complexity to the synchronization process, which can translate to more overhead. In turn, the additional overhead consumes valuable resources that could otherwise be directed elsewhere.

BRIEF DESCRIPTION OF THE DRAWINGS

Various implementations for an improved system of indicating synchronization signals that are actually transmitted in a multi-beam wireless network are described with reference to the following Figures. The same numbers may be used throughout to reference like features and components that are shown in the Figures.

DETAILED DESCRIPTION

Overview

Techniques described herein determine positioning of synchronization signal blocks. One or more implementations receive, at user equipment, at least one synchronization signal in a synchronization signal block from a first network entity, and an indication from a second network entity. The indication from the second network entity can be used to determine, by the user equipment, synchronization signal block positioning, such as time location(s). In turn, various implementations communicate with the first network entity based, at least in part, on the determined synchronization signal block(s).

Alternately or additionally, techniques provided herein provide support for multi-beam operations in a wireless network. Some implementations transmit, using a system that includes one or more network entities, at least one synchronization signal in a synchronization signal block with a subcarrier spacing on a synchronization signal frequency in a frequency band to user equipment. At least one implementation transmits, using the system and to the user equipment, an indication that provides transmission location information associated with one or more synchronization signal blocks that are actually transmitted for each of one or more sets of consecutive synchronization signal slots. In response to transmitting the indication, various implementations communicate with the user equipment based, at least in part, on the one or more synchronization signal blocks and the indication.

While features and concepts for generating synchronization signal indication messages and/or extracting synchronization signal block information can be implemented in any number of different devices, systems, environments, and/or configurations, example implementations are described in the context of the following example devices, systems, and methods.

Example Operating Environment

Figure 1:
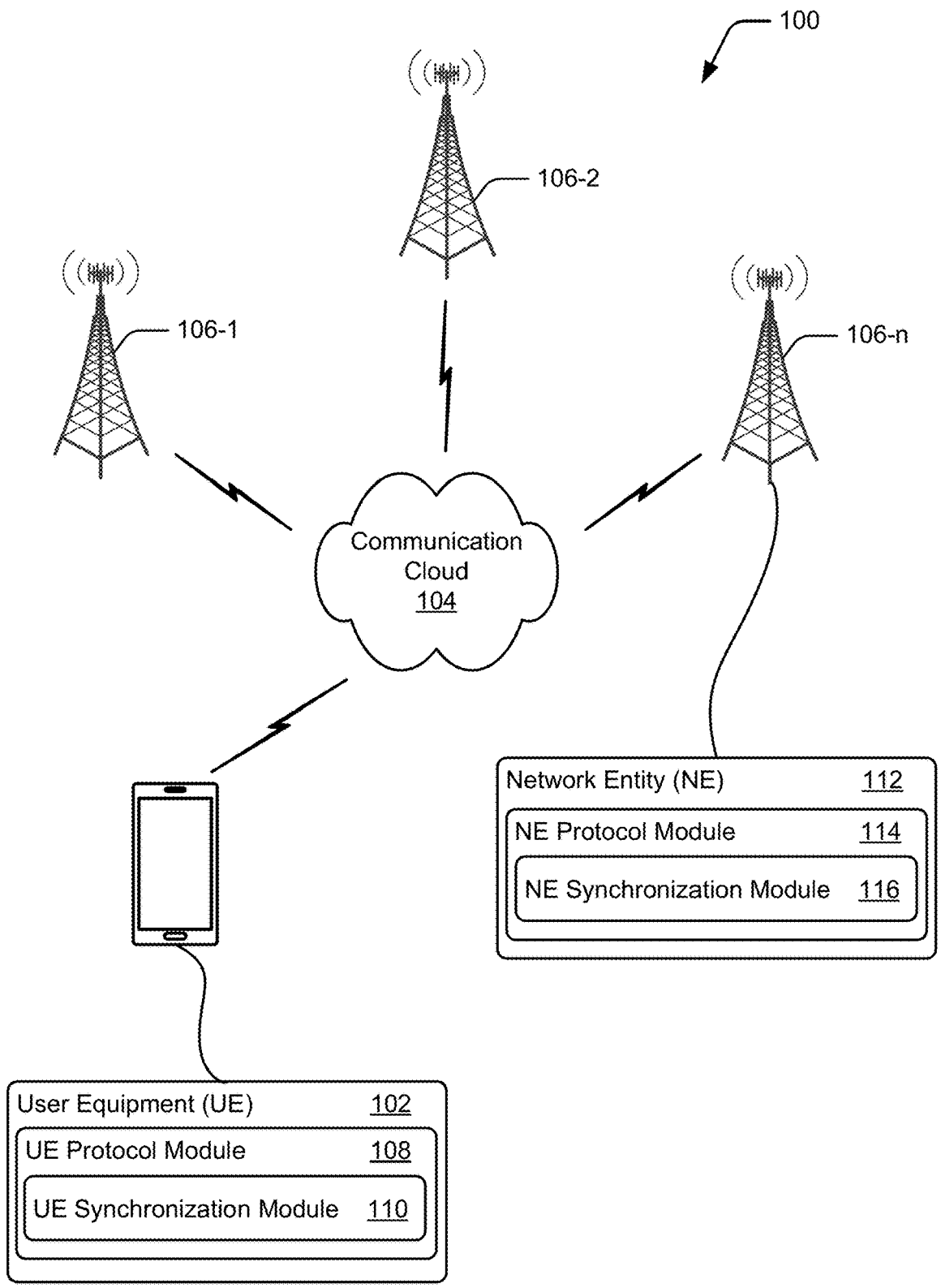
FIG. 1 illustrates an example operating environment in accordance with one or more implementations.

FIG. 1 illustrates example environment 100 according to one or more implementations. Environment 100 includes user equipment (UE) 102 illustrated as a cellular phone. The user equipment 102 includes the capability of communicating over a wireless network, generally indicated as communication cloud 104. To represent the various components that make up a wireless network, environment 100 generally includes network component 106-1, network component 106-2, and network component 106-$n$, where n is an arbitrary number that indicates a wireless network can include any suitable number of components. Each network component is illustrated as a base station that operates and communicates in conjunction with other network components to provide serving cells (associated with communication cloud 104) to various types of user equipment and/or user devices. Some implementations of user equipment 102 can support simultaneous connections to multiple network components as further described herein.

Communication cloud 104 generally represents any suitable type of wireless network that facilitates a bi-directional link between user equipment, such as user equipment 102, and various network components (e.g., network component 106-1, network component 106-2, and network component 106-$n$). Communication cloud 104 can include multiple interconnected communication networks that implement multiple interconnected elements, and support any suitable type of wireless network and/or communication system. For instance, in some implementations, communication cloud 104, as supported by the various network components, includes the ability to support various communications standards, such as $3^{rd}$ Generation Partnership Project (3GPP), 4$^{th}$ Generation (4G), Long-Term Evolution (LTE), 5$^{th}$ Generation (5G), New Radio (NR), and so forth.

In environment 100, user equipment 102 includes a UE protocol module 108. The UE protocol module 108 represents functionality that provides the ability to communicate via communication cloud 104 and/or its various network components using a corresponding wireless networking technology. For example, in the example in which communication cloud 104 supports communications as described by the various LTE communication standards, UE protocol module 108 includes a corresponding LTE protocol stack. For simplicity's sake, UE protocol module 108 is illustrated as a single module, but it is to be appreciated that various combinations of software, firmware, and/or hardware can be used to implement UE protocol module 108.

As one example, UE protocol module 108 can include various combinations of software, firmware, control logic, and/or hardware to implement a protocol stack based upon the Open Systems Interconnection (OSI) model that includes multiple layers (e.g., a physical layer, a data link layer, a network layer, etc.). Some implementations additionally partition these various layers. As one example, the data link layer can include a Medium Access Control (MAC) layer that controls the various permissions used to govern how user equipment 102 transmits, receives, extracts, and/or processes data. As another example, the physical layer of UE protocol module 108 can include hardware used to transmit and/or receive various electrical signals and/or low level software access used to configure the hardware. These various layers are then used to communicate data to other protocol stacks as further described herein.

UE protocol module 108 includes UE synchronization module 110. While illustrated as residing within UE protocol module 108, other implementations of UE synchronization module 110 reside outside of UE protocol module 108 such that UE synchronization module 110 controls various aspects of UE protocol module, such as those pertaining to UE reception and transmission synchronization with a NE. The UE synchronization module 110 represents functionality that extracts SS block indication information transmitted by NEs, and subsequently locates the indicated SS blocks and/or provides indication of rate-matching around the indicated SS blocks to UE protocol module 108 as further described herein. While illustrated as a single entity included in UE protocol module 108, it is to be appreciated that UE synchronization module 110 can be implemented in varying combinations of software, firmware, control logic, and/or hardware. Alternately or additionally, UE synchronization module 110 can reside in either a single layer of a corresponding protocol stack of UE protocol module 108, or in multiple layers of the corresponding protocol stack.

In environment 100, network component 106-$n$ includes network entity (NE) 112. Network entity 112 represents functionality used to manage communications over communication cloud 104. Thus, in environment 100, network entity 112 can monitor and manage various aspects of how user equipment 102 transmits data over communication cloud 104. To manage and support the various types of devices communicating over communication cloud 104, network entity 112 includes NE protocol module 114 to implement functionality corresponding to a protocol stack. For instance, returning to the example of communication cloud 104 supporting various forms of wireless communications, NE protocol module 114 can include an LTE or NR protocol stack corresponding to a network side device that is compatible with a protocol stack included in UE protocol module 108 corresponding to user equipment. As one skilled in the art will appreciate, this can include the ability for various layers between the two protocol modules to communicate with one another (e.g., the physical layer corresponding to UE protocol module 108 communicating with the physical layer corresponding to NE protocol module 114, etc.). To manage SS blocks transmissions (e.g., at what time, at what frequency, etc.), NE protocol module 114 includes NE synchronization module 116.

NE synchronization module 116 represents functionality that can determine transmission parameters (e.g., time locations, frequency locations, subcarrier spacing, etc.) that are used to transmit SS blocks, generate the appropriate indication messages that indicate the transmission locations of SS blocks, generate the data transmitted in an SS block, and/or manage the transmission of the SS blocks (such as by interfacing with various protocol stack layers). In some implementations, the indication messages and/or SS block information generated by NE synchronization module 116 is subsequently received and/or processed by UE synchronization module 110. While illustrated as a single entity included in NE protocol module 114, it is to be appreciated that NE synchronization module 116 can alternately be implemented external to NE protocol module 114. Further, NE protocol module 114 can be implemented in varying combinations of software, firmware, control logic, and/or hardware. As in the case of UE synchronization module 110, NE synchronization module 116 can reside in either a single layer of a corresponding protocol stack of NE protocol module 114, or in multiple layers of the corresponding protocol stack.

Having described an example operating environment that can employ SS block transmission and/or indication to support multi-beam operations in a wireless network, consider now a discussion of synchronization signal transmission and/or the indication of synchronization signal transmission, to support multi-beam operations in a wireless network in accordance with one or more implementations.

Synchronization Signal Transmission to Support Multi-Beam Operations

Various wireless networks use synchronization signals between devices to help maintain existing and/or facilitate new connections. One such example in 3GPP NR systems is the use of Primary Synchronization Signals (PSS) and Secondary Synchronization Signals (SSS). By detecting the PSS and SSS and decoding a physical broadcast channel (PBCH), UE can determine a cell identity and some of minimum system information including timing information for a cell which the UE is potentially connecting to and/or camping on. In turn, this allows the UE to read system information blocks in a particular network. UEs can acquire and detect the synchronization signals by tuning to various frequency bands which it supports and looking in specific frequency locations within each of the supported frequency bands for the PSS and/or SSS. After detecting the PSS and SSS and decoding the PBCH, UE can locate the detected PSS and SSS in a radio frame based on the determined timing information. As one skilled in the art will appreciate, a radio frame can be partitioned in the time domain into sub-frames, slots, symbols, and so forth. In some implementations, the radio frame can alternately or additionally be partitioned in the frequency domain by bandwidth and/or subcarrier frequencies. Thus, the location of the PSS and/or SSS can be referenced, and obtained, using an addressing scheme based on the various forms of partitioning.

In a 5th generation (5G) New Radio (NR) based wireless network, a network entity can generate a number of narrow beams using a large number of antenna elements. With multi-beam based network operation, the NE can transmit one or more SS blocks per period, wherein each SS block is associated with one downlink (DL) transmit (Tx) antenna port (or DL Tx beam) and can carry PSS, SSS, and/or a physical broadcast channel (PBCH). If a SS block includes PBCH in addition to PSS and SSS, it is also referred to as a 'SS/PBCH block'. In one example, a SS/PBCH block includes four consecutive orthogonal frequency division multiplexing (OFDM) symbols with the order of PSS, PBCH, SSS, and PBCH symbols.

To help in the demodulation process, UEs can assume that a SS burst set (also referred to as a "burst") includes the one or more SS blocks periodically. The maximum number of SS blocks per SS burst set and their time locations within the SS burst set period are predefined per frequency band and are also dependent on subcarrier spacing (SCS) of the synchronization signal. To help the UE, a network entity can inform the UE of the time location(s) of SS blocks actually transmitted by NEs, such that the UE receives help in the CONNECTED/IDLE mode, knows the transmission locations (e.g., time locations, frequency locations, etc.) on where to perform measurement(s), and can receive downlink data/control channels in unused SS blocks. Accordingly, the number of SS blocks actually transmitted by NEs can differ from the number of possible SS blocks that can be transmitted (e.g., there are less actual transmitted SS blocks than what the system allows). In turn, NEs transmit SS blocks within predefined possible SS block time locations, and indicate which of the predefined possible SS block time locations include actual transmitted SS blocks. A UE receives, from a first network entity, at least one synchronization signal in a synchronization signal block with a subcarrier spacing on a synchronization signal frequency in a frequency band, and receives, from a second network entity, an indication of actual transmitted synchronization signals in a synchronization signal burst set from the first network entity. In one example, the first network entity is associated with a secondary cell, while the second network entity is associated with a primary cell.

One simple way to indicate actual transmitted SS blocks is to use a binary bitmap, wherein each bit of the bitmap corresponds to one SS block time location within the minimum SS burst set periodicity, e.g. 5 milliseconds (ms), and indicates the presence (or not) of a SS block on that SS block time location. However, this scheme may lead to a large signaling overhead if the maximum allowed number of SS blocks within a SS burst set is large. For example, if there are 64 possible SS blocks that can be transmitted within the SS burst set, 64 bits are utilized to indicate the actual transmitted SS blocks, regardless of whether 64 SS blocks are transmitted within the burst since each bit has a 1:1 correspondence with a respective block of the 64 possible SS blocks.

As another example of indicating a number of actual transmitted SS blocks (versus possible SS blocks), a NE, such as a 5G base station (e.g., gNB), signals the number of actual transmitted SS blocks per SS burst set and sequentially occupies possible SS block time locations within the SS burst set starting from the first time location. This scheme allows the NE/gNB to configure UEs with a shorter duration measurement window by packing SS blocks more densely in the time domain, and utilizes $\log 2(L)$ bits, where L is the maximum number of SS blocks per SS burst set. Accordingly, in the scenario in which the NE can transmit up to 64 possible SS blocks, using a $\log 2(L)$ indication scheme utilizes $\log 2(64)=6$ bits, versus the 64 bits used in configurations with each bit having a 1:1 correspondence with a respective block. While it provides a more efficient indication scheme relative to a 1:1 correspondence indication scheme, the $\log 2(64)$ indication scheme provides less flexibility for transmitting SS blocks, since it does not allow non-contiguous SS block transmissions on the possible SS block time locations.

Various implementations provide SS block indication schemes for a multi-beam wireless network. In one or more implementations, an NE transmits a SS slot-level (e.g., for 15/30/120 kHz SCS SS) or SS slot-pair-level (e.g., for 240 kHz SCS SS) indication of a number of actual transmitted SS blocks. In one example, the number of actual transmitted SS blocks is counted per SS frequency for the given time interval (e.g., slot or slot-pair). Alternately or additionally, the number of SS blocks actually transmitted is counted by including all the SS blocks transmitted in a given wideband carrier which has multiple SS frequencies and corresponding SS blocks, for a given time interval. To accommodate this, some implementations of the corresponding SS block indexing can be structured SS frequency-first, starting from the smallest frequency to the largest frequency. Indicating the number of actual transmitted SS blocks per SS slot or SS slot-pair utilizes sequential SS block transmission on contiguous possible SS block time locations within a SS slot or a SS slot-pair on a given SS frequency, but SS block transmissions are not restricted to contiguous time locations within a SS burst set. That is, there may be one or more unoccupied SS block time locations between two consecutively transmitted SS blocks within the SS burst set. In turn, this provides more flexible SS block transmission patterns relative to other indication schemes.

Figure 2:
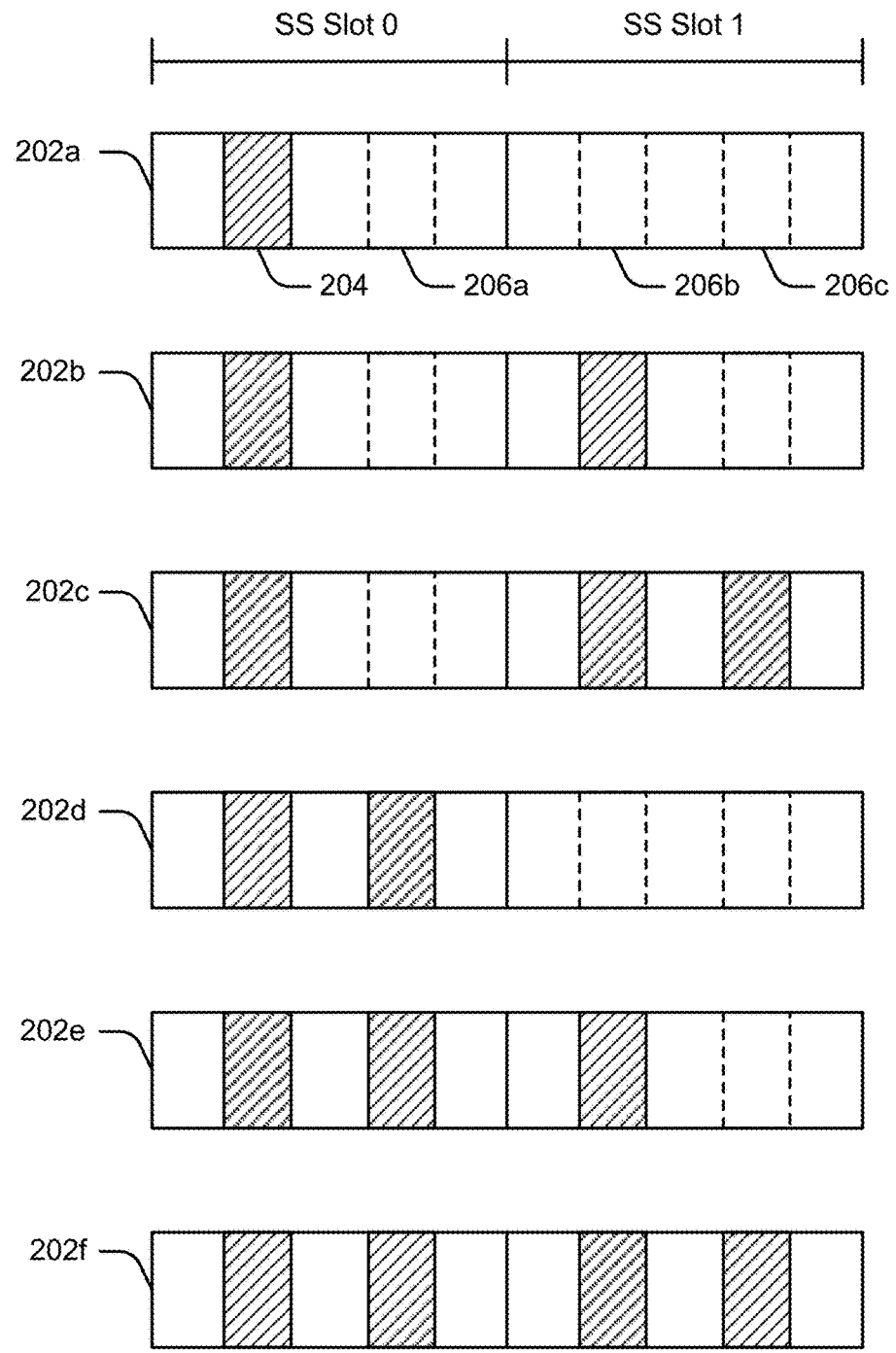
FIG. 2 illustrates allowed synchronization signal block transmission patterns in accordance with one or more implementations.
Figure 2:
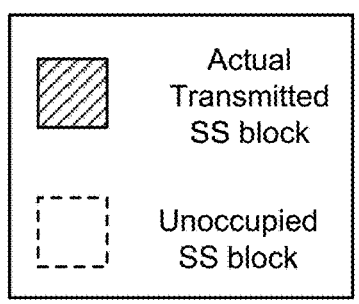

To illustrate, consider now FIG. 2, which provides examples for allowed SS block transmission patterns for the case that the maximum number of possible SS blocks per SS burst set is four (e.g., L=4). Here, the SS burst set includes two SS slots, SS slot 0 and SS slot 1, where each respective slot can have up to two actual SS block transmissions. Transmission pattern 202a illustrates an example in which there is one actual SS block transmitted over the SS burst set (transmitted SS block 204) and three unoccupied SS block transmission locations (unoccupied SS block location 206a, unoccupied SS block location 206b, and unoccupied SS block location 206c). Thus, for transmission pattern 202a, the number of actual SS block transmissions is one, while the number of possible SS block transmissions is four, with three of the four remaining unoccupied. However, alternate transmission patterns can be utilized as well. For example, transmission pattern 202b and transmission pattern 202d illustrate different transmission patterns in which there are two actual SS block transmissions over the SS burst set, and two unoccupied SS block transmission locations over the SS burst set. As another example, transmission pattern 202c and transmission pattern 202e each illustrate different transmission patterns in which there are three actual SS block transmissions over the SS burst set, and one unoccupied block transmission location over the SS burst set. As yet another example, transmission pattern 202f illustrates a scenario in which the maximum number of actual SS block transmissions equals the maximum number of possible SS block transmissions which, in this example, equates to four (e.g., L=4). Accordingly, for a given L value, the NE can transmit multiple different patterns.

The number of maximum number of possible SS blocks transmissions and/or indication of these transmissions, can be based on other factors as well. For example, in some implementations, the transmission of SS blocks within SS burst set can be confined to a 5 ms window regardless of SS burst set periodicity. Alternately or additionally, the maximum number of SS blocks within SS burst set can vary based upon a corresponding frequency range (e.g., L=4 for frequency range up to 3 GHz, L=8 for frequency range from 3 GHz to 6 GHz, and L=64 for frequency range from 6 GHz to 52.6 GHz).

The location of SS block time locations can vary based on frequency as well. To illustrate, consider a slot of 14 symbols. For SS of 15 kHz SCS and/or 30 kHz SCS, two candidate SS block time locations within the 14 symbols can be defined as: a first candidate SS block location mapping to symbols 2-5, and a second candidate SS block location mapping to symbols 8-11. However, for SS of 120 KHz SCS, the two candidate SS block time locations map differently where: the first candidate location maps to symbols 4-7, and the second candidate location maps to symbols 8-11.

This variance of SS block time locations based on frequency can apply to multi-slot and/or slot-pairs as well. For SS of 240 KHz SCS, four candidate SS block time locations can be defined in a slot-pair including two contiguous 14-symbol slots. Accordingly, in the first slot of the slot-pair, the first candidate SS block location maps to symbols 8-11. The second candidate block location bridges the two slots by mapping to symbols 12-13 of the first slot and symbols 0-1 of the second slot. In the second slot of the slot-pair, the third candidate block location maps to symbols 2-5, and fourth candidate locations maps to symbols 6-9. Accordingly, either 2 SS block locations within a SS slot (for 15 KHz, 30 KHz, and 120 KHz SCS) or 4 SS block locations within a SS slot-pair of two contiguous SS slots (for 240 KHz SCS) can be defined in the example sets of possible SS block time locations, wherein 'SS slot' refers to a slot with possible SS block time locations for 14-symbol slot configuration.

If a gNB periodically transmits a smaller number SS blocks in a SS burst set than a maximum number of SS blocks specified per frequency band, there may be multiple ways to transmit the SS blocks within an over-provisioned set of SS block time locations. In one implementation, the gNB can fully occupy possible SS block time locations within a SS slot (or SS slot-pair). In another implementation, the gNB can fully empty possible SS block time locations within the SS slot (or SS slot-pair). In other implementations, the gNB partially uses SS block time locations within the SS slot (or SS slot-pair). In one example, SS block time locations within the SS slot (or SS slot-pair) are occupied sequentially starting from the first time location. In order to define allowed transmission patterns for the SS burst set with the smaller number of SS blocks, following aspects can be considered:

Signaling overhead to indicate actually transmitted SS blocks:
  If each location of all the possible SS block time locations can be flexibly selected (or not selected), signaling overhead for indication would increase significantly.
Flexible time division duplexing (TDD) operation:
  It may be productive to configure the entire SS slot duration as downlink (DL) or uplink (UL) communication, in order to reduce overhead for DL-to-UL switching guard time, unless latency-sensitive traffics have an urgency to be served. Thus, fully occupying or fully emptying defined SS block time locations within a SS slot (or a SS slot-pair) is desirable to support.

For latency-sensitive UL and DL traffic, it can be desirable to transmit only one SS block in a SS slot and to use the remaining symbols of the SS slot for uplink communication. For SS of 240 KHz SCS, 1~3 SS blocks can be transmitted in a DL region of a SS slot-pair and the remaining symbols of the SS slot-pair can be used for UL. For a DL control region defined from the beginning of a slot, transmitting SS blocks on consecutive possible SS block time locations within the SS slot (for 15/30/120 kHz SCS) or within the SS slot-pair (for SS of 240 kHz SCS) starting from the first possible time location can reduce DL-to-UL and/or UL-to-DL switching frequencies and associated guard time overhead.

Assuming that at least one SS block is transmitted per SS burst set on the first time location and that each SS slot/SS slot-pair has M (e.g., M=2 or 4) possible time locations, the first SS slot has M possible patterns and each of the remaining SS slots or SS slot-pairs has (M+1) possible patterns including the case of zero SS block transmission in the corresponding SS slot or SS slot-pair. Thus, the total number of possible SS block transmission patterns is given by:

$$M \cdot (M+1)^{(L/M-1)}$$

where L is the maximum number of SS blocks per SS burst set. Using these definitions, consider the following methods that can be used to derive the number of actually transmitted SS blocks in a SS slot (or SS slot-pair) using indication data.

Method 1: Binary bits for indication include $\log_2 M$ bits representing the number of SS blocks in the first SS slot (or SS slot-pair) and K bits representing possible SS block transmission patterns for the remaining (L/M−1) SS slots (or SS slot-pairs).

a. Binary bits for indication: $a_0, \ldots, a_{\log_2 M-1}, b_0, b_1, \ldots, b_{K-1}$, where $K=\lceil (L/M-1)\log_2(M+1) \rceil$
  b. Upon receiving the binary bits for indication, UE can derive the number of the SS blocks actually transmitted in a SS slot (or SS slot-pair), i, $c_i$, as follows:
    i. The first SS slot (or SS slot-pair):

$$c_0 = 1 + a_0 + a_1 \cdot 2 + \ldots, a_{\log_2 M-1} \cdot 2^{\log_2 M-1}$$

ii. The remaining SS slots (or SS slot-pairs):

$$c_i = \left\lfloor \frac{X}{(M+1)^{i-1}} \right\rfloor \bmod(M+1),$$

where i=1, . . . , (L/M−1),
      $c_i \in \{0, 1, \ldots, M\}$, and
      $X = b_0 + b_1 \cdot 2 + \ldots, b_{K-1} \cdot 2^{K-1} = c_1 + c_2 \cdot (M+1) + \ldots, c_{L/M-1} \cdot (M+1)^{L/M-2}$ Method 1A: N is the number of SS blocks actually transmitted in the SS burst set out of the L maximum number of SS blocks per SS burst set. The positions of the N SS blocks corresponding to the SS block (time location) indices in set $\{k_i\}_{i=0}^{N-1}$, $(1 \le k_i \le L, k_i < k_{i+1})$ is given by a combinatorial index r given by equation $$r = \sum_{i=0}^{N-1} \binom{L-k_i}{N-i} \text{ and}$$

-continued $$\begin{Bmatrix} x \\ y \end{Bmatrix} = \begin{cases} \begin{pmatrix} x \\ y \end{pmatrix} & x \geq y \\ 0 & x < y \end{cases}$$

is the extended binomial coefficient, resulting in unique label $$r \in \left\{0, \ldots, \begin{pmatrix} L \\ N \end{pmatrix} - 1\right\}.$$

The UE is indicated (from an NE) at least N, and the combinatorial index r to determine the SS block positions of the actually transmitted SS blocks in the SS burst set. In at least one example, N is one less than the number of SS blocks actually transmitted, i.e., (N'=N−1 and L'=L−1 with N' and L' used instead of N and L respectively in the above equations) if it is assumed that at least one SS block is transmitted in a fixed position/location (e.g., the first SS block time location/position in the first SS slot/slot-pair is always transmitted. If N'=0, then the combinatorial index r is peripheral and may not be signaled).

Method 2: Binary bits for indication includes $$\left(\frac{L}{M}\right) \cdot \log_2(M) \text{ bits,}$$

each $\log_2(M)$ bits of which may represent the number of transmitted SS blocks in a SS slot (or SS slot-pair), and length-(L/M−1) bitmap, each bit of which corresponds to a certain SS slot (or SS slot-pair) except for the first SS slot (or SS slot-pair) and bit '0' indicates whether there is no SS block in the SS slot (or SS slot-pair).

a. Binary bits for indication:

$a_0^{(0)}, \ldots, a_{\log_2 M-1}^{(0)}, a_0^{(1)}, \ldots, a_{\log_2 M-1}^{(1)}, \ldots, a_0^{(K-1)}, \ldots, a_{\log_2 M-1}^{(K-1)}, b_0, b_1, \ldots, b_{K-2}$, where

K=L/M b. Upon receiving the binary bits for indication, UE can derive the number of SS blocks that are actually transmitted in a SS slot (or SS slot-pair), i, $c_i$, as follows:
 i. The first SS slot (or SS slot-pair):

$c_0 = 1 + a_0^{(0)} + a_1^{(0)} \cdot 2 + \ldots, a_{\log_2 M-1}^{(0)} \cdot 2^{\log_2 M-1}$ ii. The remaining SS slots (or SS slot-pairs):

$c_i = (1 + a_0^{(i)} + a_1^{(i)} \cdot 2 + \ldots, a_{\log_2 M-1}^{(i)} \cdot 2^{\log_2 M-1}) \cdot b_{i-1}$, where i=1, . . . ,(K−1)

Method 3: Binary bits for indication includes a length-(L/M−1) bitmap, each of which corresponds to a certain SS slot (or SS slot-pair) except for the first one and indicates whether there is no SS block in the SS slot (or SS slot-pair), and (P+1)·$\log_2(M)$ bits (variable number of bits), where P+1 represents the number of SS slots (or SS slot-pairs) with non-zero SS block transmission and each set of $\log_2(M)$ bits represents the number of transmitted SS blocks in a SS slot (or SS slot-pairs) with non-zero SS block transmission.

a. Binary bits for indication:

$b_0, b_1, \ldots, b_{K-2}, a_0^{(0)}, \ldots, a_{\log_2 M-1}^{(J_1)}, a_0^{(J_1)}, \ldots, a_{\log_2 M-1}^{(J_1)}, \ldots, a_0^{(J_P)}, \ldots, a_{\log_2 M-1}^{(J_P)}$, where $K=L/M, b_{J_{p-1}}=1$ for $p \in \{1, \ldots, P\}$ and $\{J_p\}_{p=1}^P \subset \{1, \ldots, K-1\}$, and $b_{k-1}=0$ for $k \in \{1, \ldots, K\} - \{J_p\}_{p=1}^P$.

b. Upon receiving the binary bits for indication, UE can derive the number of SS blocks actually transmitted in a SS slot (or SS slot-pair) i, $c_i$, as follows:
 i. The first SS slot (or SS slot-pair):

$c_0 = 1 + a_0^{(0)} + a_1^{(0)} \cdot 2 + \ldots, a_{\log_2 M-1}^{(0)} \cdot 2^{\log_2 M-1}$ ii. The remaining SS slots (or SS slot-pairs):

$c_i = 1 + a_0^{(i)} + a_1^{(i)} \cdot 2 + \ldots, a_{\log_2 M-1}^{(i)} \cdot 2^{\log_2 M-1}$, if $i \in \{J_p\}_{p=1}^P$.

Otherwise, $c_i = 0$. i=1, . . . , (K−1)

Method 3A: N is the number of (actual) transmitted SS blocks in the SS burst set out of the L maximum number of SS blocks per SS burst set, where S is the number of SS slots/slot-pairs with transmitted SS blocks in the SS burst set out of the K=L/M maximum number of possible SS slots/slot-pairs per SS burst set. Each of the K possible SS slots/slot-pairs per SS burst set is indexed from 1 to K−1. The positions of the S SS slots/slot-pairs corresponding to the SS slots/slot-pairs indices in set $\{s_i\}_{i=0}^{S-1}$, (1≤$s_i$≤K, $s_i$<$s_{i+1}$) is given by a combinatorial index r given by equation $$r = \sum_{i=0}^{S-1} \begin{Bmatrix} K - s_i \\ S - i \end{Bmatrix} \text{ and } \begin{Bmatrix} x \\ y \end{Bmatrix} = \begin{cases} \begin{pmatrix} x \\ y \end{pmatrix} & x \geq y \\ 0 & x < y \end{cases}$$

is the extended binomial coefficient, resulting in unique label $$r \in \left\{0, \ldots, \begin{pmatrix} K \\ S \end{pmatrix} - 1\right\}.$$

SS blocks are approximately equally divided between the S SS slot/slot-pairs with SS block transmissions. The number of SS blocks in SS slot/slot-pairs with SS slots/slot-pairs index $s_i$ is given as $$J_i = \begin{cases} \text{round}(N/S), & i = 0, 1, \ldots S-2 \\ N - (S-1) \cdot J_o, & i = S-1 \end{cases}$$

In one or more implementations, N is the number of actual transmitted SS blocks in each SS slots/slot-pairs with SS slots/slot-pairs index $s_i$, so $J_i = N$. SS blocks in each SS slot/slot-pairs $s_i$ are transmitted sequentially from the first SS block time location/position (one SS blocks at a time location/position or more than one SS blocks at a time location/position in case of multiple SS frequencies at a given time interval) in the SS slot/slot-pairs $s_i$. The UE is indicated at least N, S, and the combinatorial index r to determine the actual transmitted SS block positions in the SS burst set.

In one or more examples, if N=1 and if it is assumed that at least one SS block is actually transmitted by NEs in a fixed position/location, e.g., the first SS block time location/position in the first SS slot/slot-pair is always transmitted, then S and the combinatorial index r are peripheral and may not signaled.

In another example, if a predetermined SS slot(s)/slot-pair(s) always carries an actual transmitted SS block from an NE, such as the first SS slot/slot-pair in the SS burst set, then the first SS slot/slot-pair ($s_0$) can be excluded from the SS slots/slot-pairs signaling and the combinatorial index r indicates the SS slots/slot-pairs indices $\{s'_i\}_{i=0}^{S'-1}(1<s'_i\leq K'$, $s'_i<s'_{i+1})$ excluding the first SS slot/slot-pair. This may be done with S'=S−1, K'=K−1 in the combinatorial index equation, and $s_0=1$, $s_i=s'_{i-1}$ i=1, 2, . . . , S. If S'=0, i.e., only actual transmitted SS blocks from an NE are in the predetermined SS slot(s)/slot-pairs(s), then the combinatorial index r is peripheral and may not signaled.

Figure 3:
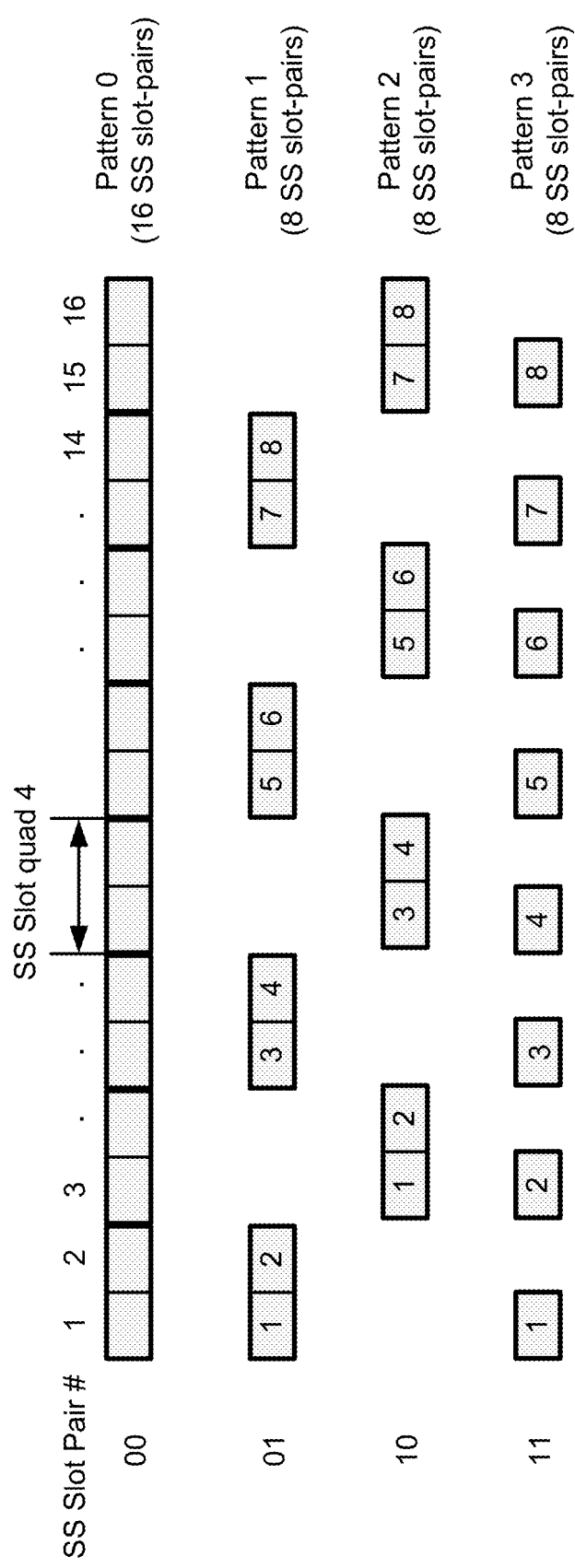
FIG. 3 illustrates example pre-defined synchronization signal slot-pair selection patterns in accordance with one or more implementations.

Thus, the various methods provide a way for NEs and UEs to exchange information pertaining to an actual number of transmitted SS blocks and/or their locations. Table 1 below provides a number comparison of the minimum bits utilized for the different indication methods described above.

slot-pairs, wherein each SS slot-pair comprises 2 SS slots and includes 4 SS block time locations. If four SS slot-pair selection patterns are predefined as shown in FIG. 3 (labeled here as "Pattern 0", "Pattern 1", "Pattern 2", and "Pattern 3"), two bits are utilized to indicate one of the predefined SS slot-pair selection patterns. Further, an 8 bit-length bitmap can be used for further selecting SS slot-pairs within the chosen predefined pattern.

Finally, a 2-bit indication can be used for indicating the number of actual transmitted SS blocks on contiguous SS block time locations in each SS slot-pair. This 2-bit indication can be transmitted for all eight SS slot-pairs in the predefined pattern or only for the SS slot-pairs with actual SS block transmission. The former uses the total 26 bits for indication, while the latter leads to variable number of bits between 12 bits (assuming at least one SS block is actually

TABLE 1

Comparison of a minimum number of bits utilized for different indication methods

| Indication method & determination of bit length | L | M | Number of SS block transmission patterns supported | Minimum Number of bits utilized | Overhead reduction compared to SS block-level bitmap |
|---|---|---|---|---|---|
| Method 1: | 4 | 2 | 6 | 3 | 25% |
| $\log_2 M + \lceil (L/M - 1)\log_2(M + 1) \rceil$ | 8 | 2 | 54 | 6 | 25% |
|  | 64 | 2 | $1.2353 \times 10^{15}$ | 51 | 20% |
|  | 64 | 4 | $1.2207 \times 10^{11}$ | 37 | 42% |
| Method 2: | 4 | 2 | 6 | 3 | 25% |
|  | 8 | 2 | 54 | 7 | 13% |
| $\frac{L}{M} \cdot \log_2(M) + \frac{L}{M} - 1$ | 64 | 2 | $1.2353 \times 10^{15}$ | 63 | 2% |
|  | 64 | 4 | $1.2207 \times 10^{11}$ | 47 | 27% |
| Method 3: | 4 | 2 | 6 | 2~3 | 25% or 50% |
|  | 8 | 2 | 54 | 4~7 | 13%~50% |
| $(1+k) \cdot \log_2(M) + \left(\frac{L}{M} - 1\right),$ | 64 | 2 | $1.2353 \times 10^{15}$ | 32~63 | 2%~50% |
|  | 64 | 4 | $1.2207 \times 10^{11}$ | 17~47 | 27%~73% |
| where $k \in \{0, 1, \ldots, \frac{L}{M} - 1\}$ |  |  |  |  |  |

While all these methods provide improved signaling overhead through a reduction of indication bits, it can be seen in Table 1 that method 1 and method 3 provide a more significant improvement relative to Method 2, thus making methods 1 and 3 more desirable to use from an efficiency point of view. Method 1 can achieve up to 42% signaling overhead reduction compared to SS block-level bitmap signaling, and method 3 can achieve up to 73% reduction. Method 1 can maintain low or moderate signaling overhead irrespective of the number of actual transmitted SS blocks per SS burst set. Meanwhile, it may utilize slightly higher computational complexity for the UE to derive the number of SS blocks that are actually transmitted from NEs in each SS slot (or SS slot-pair) compared to method 2 and method 3. The overhead of method 3 varies, depending on the number of actual transmitted SS blocks per SS burst set and the number of non-empty SS slots (or SS slot-pairs), i.e. SS slots (or SS slot-pairs) with at least one SS block transmission. Method 2 can also reduce signaling overhead considerably, if the ratio of the maximum number of SS blocks per SS burst set, L, to the maximum number of SS blocks per SS slot (or SS slot-pair), M, is properly selected.

Consider now FIG. 3, which illustrates examples of pre-defined SS slot-pair selection patterns for L=64, M=2. In one or more implementations, a gNB may select one of predefined SS slot-pair selection patterns for further signaling overhead reduction. For example, for the case of L=64 and M=2 (with SS of 120 KHz SCS), there are 16 SS transmitted by an NE) and 26 bits. To reduce the variable number of bit options to a finite number of supported bit-widths (e.g., four options 12, 16, 20, 26 bits), a header (e.g., 2 bits for the 4 bit-width options) can be included to indicate the one of the possible bit-widths To enhance transmission flexibility, the number of predefined patterns can be increased from four to eight, which leads to only 1 bit increase in the signaling. Note for "Pattern 0" slot-pair selection pattern case in FIG. 3 it is defined that all the SS block time locations are occupied such that the 16 bits for indicating the actual transmitted SS block time locations go unused in that case. In another implementation for "Pattern 0", an 8-bit bitmap is used to select from the eight available SS slot-quads and 16-bits is used to determine which SS block time locations in each selected SS slot-quad are occupied. In one case there are 2-bits per SS slot-quad (for a total of 16 bits) for indicating occupied SS block time locations of each selected SS slot-quad. In another implementation regarding "Pattern 0" slot-pair selection pattern case, those 16 bits can be used as a bitmap to select SS slot-pairs within the 16 available slot-pairs which assume the SS block time locations of the selected SS slot-pair are all occupied. In another implementation the N=16 bits or N=24 bits can be used to pick from $2^{\wedge}N-1$ joint SS block-pairs and SS block transmission patterns of selected SS block-pairs for "Pattern 0" case.

In the above examples, instead of the granularity at the SS slot/slot-pair level, contiguous set of SS slots/slot-pairs may be grouped to reduce the number of bits used for an indication. In the examples above, the indication of the SS blocks that are actually transmitted by NEs can be signaled semi-statically. Since a UE may assume that a given SS block is repeated with a SS burst set periodicity, the gNB should not change a SS block transmission pattern dynamically, but may maintain the same pattern for long time or update the pattern semi-statically. Considering that the number of indication bits is quite large for L=64, it may not be suitable to include the indication bits in PBCH. Instead, including the indication in RMSI can be considered. If a PDCCH scheduling a Physical Downlink Scheduled Channel (PDSCH) carrying remaining minimum system information (RMSI) and the corresponding PDSCH carrying RMSI are transmitted in a way not overlapping with any SS block transmission, UE can receive RMSI without the knowledge for actually transmitted SS blocks. After receiving RMSI, UE can properly perform rate-matching around the SS blocks actually transmitted by the NE(s). Thus, the gNB can flexibly transmit PDCCHs and PDSCHs related to other SI and user plane data.

Figure 4:
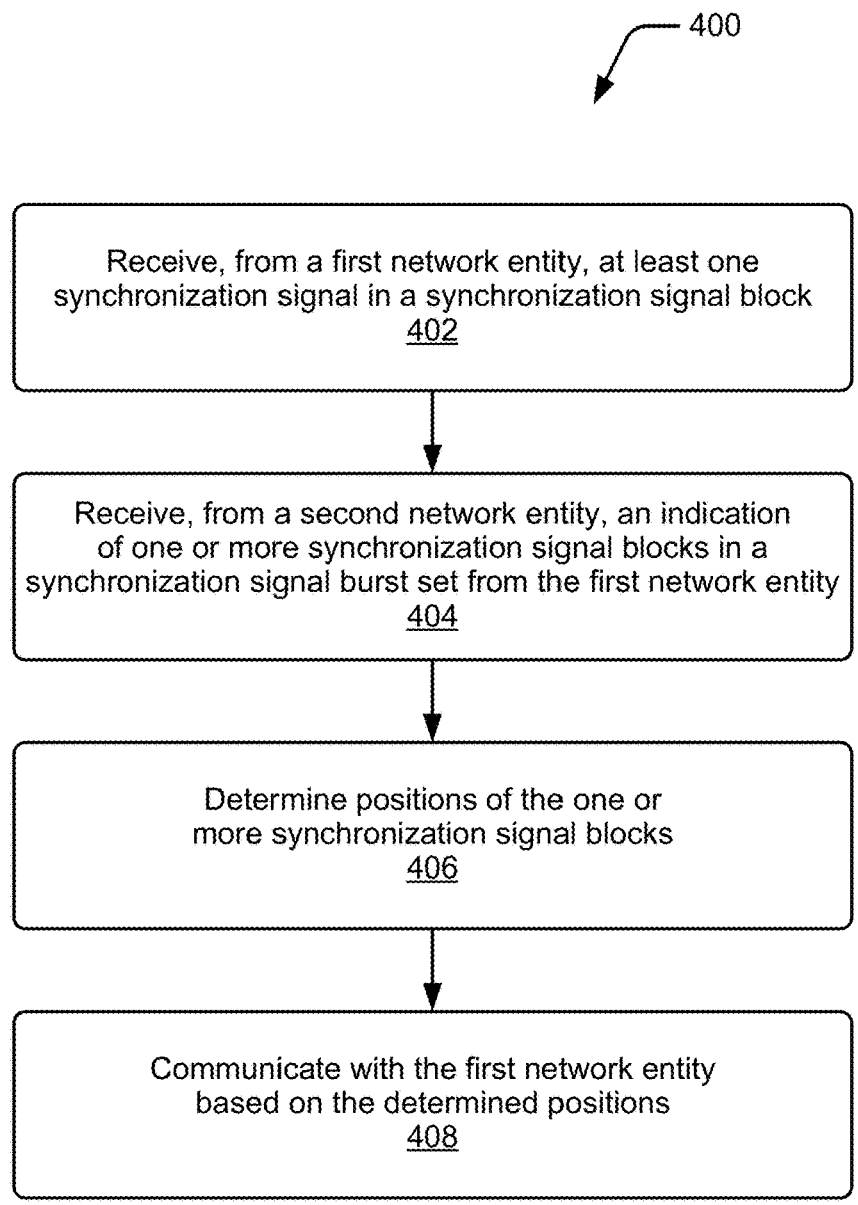
FIG. 4 illustrates an example method of synchronization signal and indication reception to support multi-beam operation in accordance with one or more implementations.

FIG. 4 illustrates an example method 400 of user equipment determining synchronization signal transmissions from network entities by receiving indications of the synchronization signal transmissions in accordance with one or more implementations. Generally, any services, components, modules, methods, and/or operations described herein can be implemented using software, firmware, hardware (e.g., fixed logic circuitry), manual processing, or any combination thereof. For instance, method 400 can be performed by varying combinations of User Equipment 102 (by way of UE protocol module 108 and/or UE synchronization module 110), of FIG. 1, and/or User Equipment Device 600 (by way of any combination of communication transceiver(s) 602, processing system 608, processing & control 610, protocol stack module 618, synchronization control module 620, etc.) of FIG. 6 as further described herein. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 400 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 402, user equipment receives, from a first network entity, at least one synchronization signal in a synchronization signal block. In one or more implementations, the synchronization signal block has a particular subcarrier spacing on a particular synchronization signal frequency in a particular frequency band.

At 404, the user equipment receives, from a second network entity, an indication of one or more synchronization signal blocks in a synchronization signal burst set from the first network entity. In one or more implementations, the indication includes information associated with the one or more synchronization signal blocks for each of one or more sets of consecutive synchronization signal slots. In one implementation, the indication includes information that the user equipment can use to derive a number of synchronization signal blocks that are actually transmitted by the first network entity for each of multiple synchronization signal-slots as further described herein. Alternately or additionally, the indication can include information used by the user equipment to derive a number of synchronization signal slot-pairs each of which includes at least one synchronization signal block transmitted by the first network entity. In at least one implementation, each synchronization signal slot, or synchronization signal slot-pair includes at least one potential synchronization signal block time location.

In some implementations, the user equipment receives the indication in a system information burst. The system information burst can alternately or additionally be received in a Physical Broadcast CHannel (PBCH) and/or a remaining minimum system information (RMSI) received on a Physical Downlink Scheduled Channel (PDSCH). In some implementations, the user equipment receives the indication in a dedicated radio resource control (RRC) message.

The user equipment can receive a bitmap in the indication, wherein each respective bit in the bitmap corresponds to a respective set of consecutive synchronization signal slots of the one or more sets of consecutive synchronization signal slots, and each respective bit in the bitmap indicates the presence of at least one synchronization signal block in the respective set of consecutive synchronization signal slots. In some implementations, the user equipment receives a first number of binary bits in the indication, wherein the first number of binary bits is dependent on at least a number of possible synchronization signal block time locations per set of consecutive synchronization signal slots, and receives a second number of binary bits in the indication, wherein the second number of binary bits is dependent on the one or more sets of consecutive synchronization signal slots. In at least one implementation, the second number of binary bits is equal to a number of sets of consecutive synchronization signal slots. In some implementations, the user equipment receives in the indication, a number, N, that denotes the number of the one or more synchronization signal blocks in the synchronization signal burst set and receives, in the indication, a combinatorial index, r, wherein the combinatorial index, r, is given by an equation $$r = \sum_{i=0}^{N-1} \binom{L-k_i}{N-i} \text{ and } \binom{x}{y} = \begin{cases} \binom{x}{y} & x \geq y \\ 0 & x < y \end{cases}$$

is the extended binomial coefficient, and wherein $\{k_i\}_{i=0}^{N-1}$, ($1 \leq k_i \leq L$, $k_i < k_{i+1}$) is a set of the positions of the N synchronization signal blocks actually transmitted by the first network entity and correspond to synchronization signal block time location indices. Alternately or additionally, the user equipment can receive the indication with a first number of binary bits, where the first number is dependent on a number of possible time locations per synchronization signal slot of multiple synchronization signal slots (M), and a maximum number of synchronization signal blocks per synchronization signal burst set (L).

In some implementations, the first network entity and the second network entity are the same network entity, while in other implementations, the first network entity and the second network entity are different from one another. In response to the first network entity and the second network being different entities, some implementations of the first network entity are associated with a secondary cell, while implementations of the second network entity are associated with a primary cell.

At 406, the user equipment determines positions of the one or more synchronization signal blocks that are actually transmitted by the first network entity based on the indication. Alternately or additionally, the user equipment determines the positions using a value of the particular subcarrier spacing and/or a value of the particular frequency band. This can include determining a number of synchronization signal blocks for each of the synchronization signal slots by counting the one or more synchronization signal blocks that are actually transmitted in the synchronization signal burst set on the synchronization signal frequency for a slot duration. Alternately or additionally, some implementations determine the positions by determining that a subset of synchronization signal blocks that are actually transmitted in the synchronization signal burst set is transmitted sequentially on contiguous potential synchronization signal block time locations within a synchronization signal slot of multiple synchronization signal slots. Accordingly, in some implementations, the user equipment can derive the number of SS blocks that are actually transmitted by the first network entity using, and/or base the derivation of the number of actual transmitted SS blocks off of, various aspects of method 1 (and/or 1A), method 2, and/or method 3 (and/or 3A) as further descried herein.

At 408, the user equipment communicates with the first network entity based on the determined positions of the synchronization signal blocks that are transmitted by the first network entity in the synchronization signal burst set, such as by directing and/or managing what carrier, subcarrier, frequency band, block, time slot, etc., the communication transceivers at the UE receive information on, what data the UE receives, how data is interpreted, etc. In some implementations, the user equipment performs rate-matching around the synchronization signal blocks that are transmitted by the first network entity.

Figure 5:
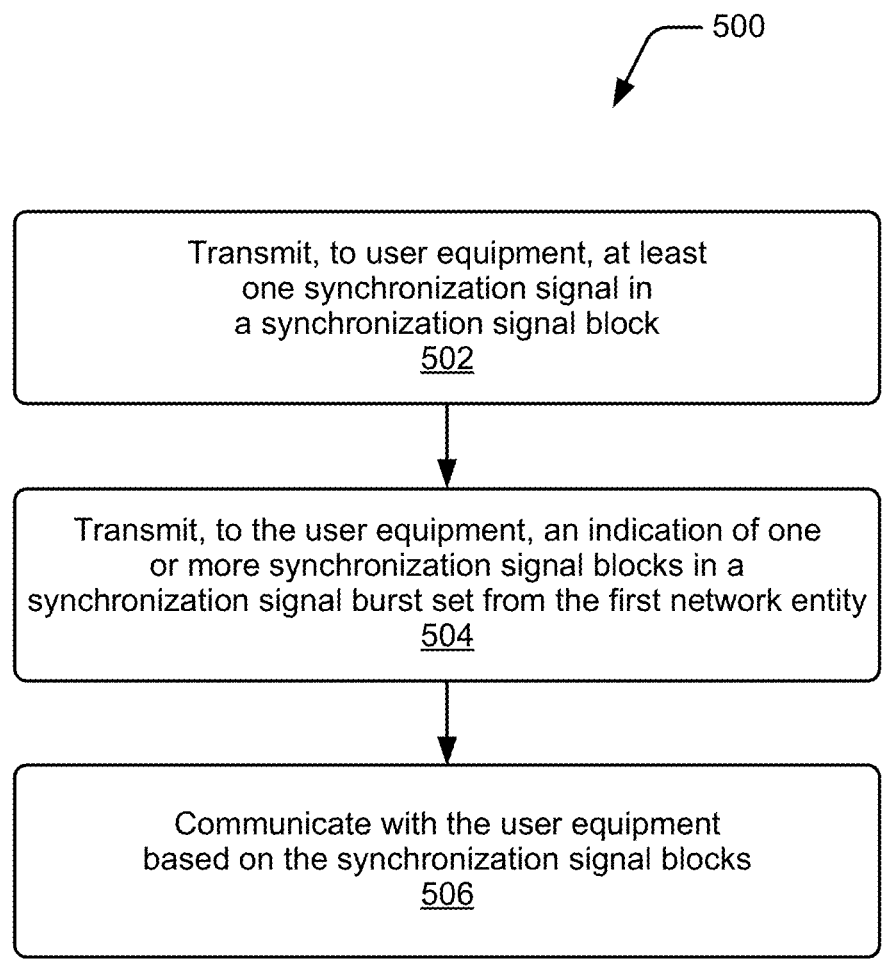
FIG. 5 illustrates an example method of synchronization signal and indication transmission to support multi-beam operation in accordance with one or more implementations.

Consider now FIG. 5 that illustrates an example method 500 in which one or more network entities establish a communication link with user equipment using indications of synchronization signal transmissions in accordance with one or more implementations. Generally, any services, components, modules, methods, and/or operations described herein can be implemented using software, firmware, hardware (e.g., fixed logic circuitry), manual processing, or any combination thereof. For instance, method 500 can be performed by one or more instances of Network Entity 112 (by way of NE protocol module 114 and/or NE synchronization module 116), of FIG. 1, and/or Network Entity Device 700 (by way of any combination of communication transceiver(s) 702, processing system 708, processing & control 710, protocol stack module 718, synchronization control module 720, etc.) of FIG. 7 as further described herein. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by any combination of hardware, software and/or firmware. While method 500 illustrates steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 502, one or more implementations transmit at least one synchronization signal in a synchronization signal block to user equipment. This can include transmitting the synchronization block with a particular subcarrier spacing on a particular synchronization signal frequency in a particular frequency band.

At 504, one or more implementations transmit an indication of one or more synchronization signal blocks in a synchronization signal burst set to the user equipment. Various implementations transmit the at least one synchronization signal in the synchronization signal block using a first network entity, and transmit the indication of the one or more synchronization signal blocks using a second network entity. Alternately or additionally, a same network entity can transmit the at least one synchronization signal in the synchronization signal block and the indication of the one or more synchronization signal blocks.

As further described herein, the indication can include information that can be used by the user equipment to derive the number of synchronization signal blocks transmitted by NE(s) for each of multiple synchronization signal-slots and/or the number of synchronization signal slot-pairs. Various implementations transmit the indication in a system information burst, such as via a PBCH and/or an RMSI received on a PDSCH. Alternately or additionally, one or more implementations transmit the indication in a dedicated RRC message. Various implementations transmit a bitmap in the indication, such as a bitmap where each respective bit in the bitmap corresponds to a respective set of consecutive synchronization signal slots of one or more sets of consecutive synchronization signal slots, and each respective bit indicates the presence of at least one synchronization signal block in the respective set of consecutive synchronization signal slots.

Alternately or additionally, some implementations transmit a first number of binary bits in the indication, where the first number of binary bits is dependent on at least a number of possible synchronization signal block time locations per set of consecutive synchronization signal slots, and/or transmit a second number of binary bits in the indication, wherein the second number of binary bits is dependent on the one or more sets of consecutive synchronization signal slots. In one or more implementations, the second number of binary bits is equal to the number of sets of consecutive synchronization signal slots.

In at least one implementation, the indication includes a number, N, that denotes the number of the one or more synchronization signal blocks in the synchronization signal burst set that are actually transmitted, and a combinatorial index, r, as further described herein. In some implementations, the indication includes a first number of binary bits that is dependent on a number of possible time locations per synchronization signal slot of multiple synchronization signal slots (M), and a maximum number of synchronization signal blocks per synchronization signal burst set (L).

In response to transmitting at least one synchronization signal and the indication, various implementations communication with the user equipment at 506, where the communications are based on the information included in the synchronization signal blocks as further described herein.

Accordingly, various implementations implement a system comprising one or more network entities, individual ones of which comprise at least one transceiver that, collectively: transmits, to a device, at least one synchronization signal in a synchronization signal block with a subcarrier spacing on a synchronization signal frequency in a frequency band; and transmits, to the device, an indication of one or more synchronization signal blocks in a synchronization signal burst set from the one or more network entities, the indication including information associated with the one or more synchronization signal blocks for each of one or more sets of consecutive synchronization signal slots, each respective synchronization signal slot of the one or more sets of consecutive synchronization signal slots including at least one potential synchronization signal block time location, and wherein one of the one or more network entities further comprises at least one processor system that directs the at least one transceiver to communicate with the device based on the one or more synchronization signal blocks in the synchronization signal burst set.

In at least one implementation, the at least one transceiver of the system transmits the indication in a system information burst. Alternately or additionally, the at least one transceiver transmits the system information burst in a PBCH. As another example, in one or more implementations, the at least one transceiver transmits the system information burst in an RMSI that is transmitted on a PDSCH.

In one or more implementations, the at least one transceiver of the system transmits the indication in an RRC message.

In one or more implementations, the at least one transceiver of the system transmits a bitmap, wherein each respective bit in the bitmap corresponds to a respective set of consecutive synchronization signal slots of the one or more sets of consecutive synchronization signal slots, and each respective bit in the bitmap indicates the presence of at least one synchronization signal block in the respective set of consecutive synchronization signal slots.

In one or more implementations, the at least one transceiver of the system transmits a first number of binary bits in the indication, wherein the first number of binary bits is dependent on at least a number of possible synchronization signal block time locations per set of consecutive synchronization signal slots. Alternately or additionally, the at least one transceiver transmits a second number of binary bits in the indication, wherein the second number of binary bits is dependent on the one or more sets of consecutive synchronization signal slots. In some implementations, the second number of binary bits is equal to a number of sets of consecutive synchronization signal slots.

In one or more implementations, the at least one transceiver of the system transmits, in the indication, a number, N, that denotes the number of the one or more synchronization signal blocks in the synchronization signal burst set, and wherein the at least one transceiver transmits, in the indication, a combinatorial index, r, wherein the combinatorial index, r, is given by an equation $$r = \sum_{i=0}^{N-1} \binom{L-k_i}{N-i} \text{ and } \binom{x}{y} = \begin{cases} \binom{x}{y} & x \geq y \\ 0 & x < y \end{cases}$$

is the extended binomial coefficient, and wherein $\{k_i\}_{i=0}^{N-1}$, ($1 \leq k_i \leq L$, $k_i < k_{i+1}$) is a set of the positions of the N synchronization signal blocks corresponding to synchronization signal block time location indices.

In one or more implementations, a same transceiver of a same network entity of the one or more network entities of the system transmits the at least one synchronization signal in the synchronization signal block and the indication of the one or more synchronization signal blocks in a synchronization signal burst set.

In one or more implementations, a first transceiver of a first network entity of the one or more network entities of the system transmits the at least one synchronization signal in the synchronization signal block, and a second transceiver of a second network entity of the one or more network entities of the system transmits the indication of the one or more synchronization signal blocks in a synchronization signal burst set. In some implementations, the first network entity is associated with a secondary cell, and the second network entity is associated with a primary cell.

Having considered a discussion of synchronization signal transmission and/or the indication of synchronization signal transmission, to support multi-beam operations in a wireless network in accordance with one or more implementations, consider now example computing devices that can implement the various implementations described above.

Example Devices

Figure 6:
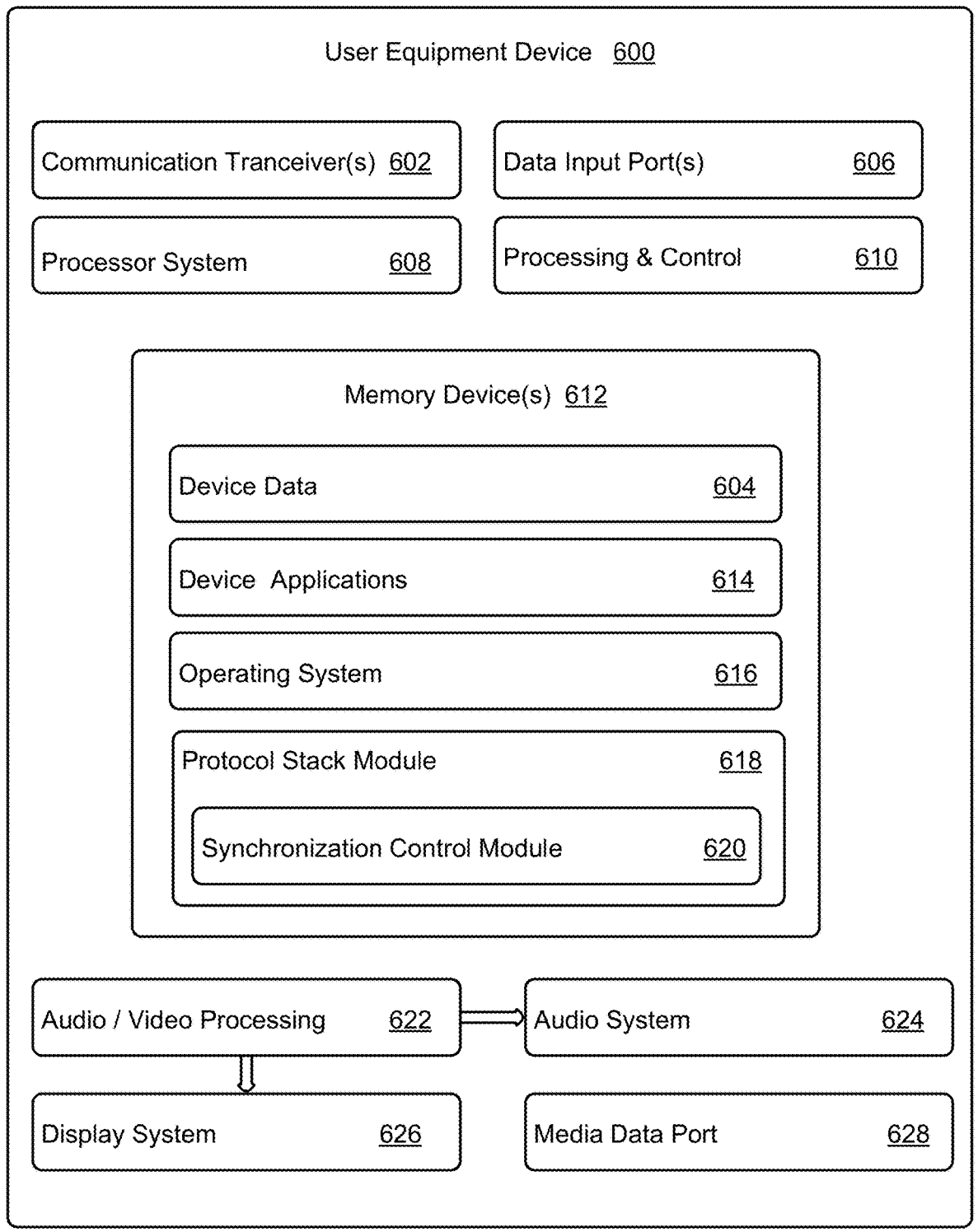
FIG. 6 illustrates various components of an example device that can implement various implementations.
Figure 7:
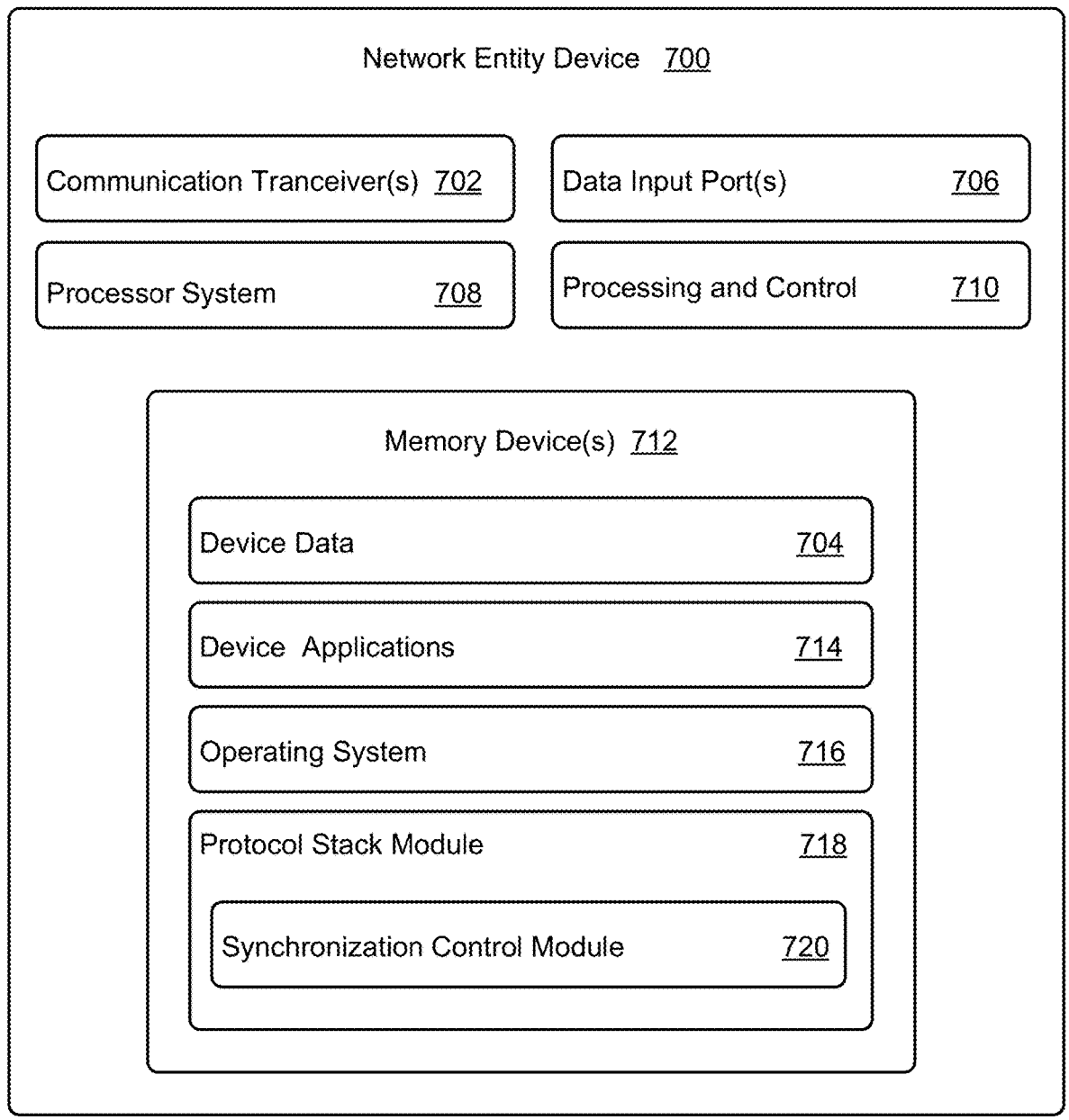
FIG. 7 illustrates various components of an example device that can implement various implementations.

FIG. 6 illustrates various components of an example user equipment device 600 in which SS reception, and the reception of the indication of SS actually transmitted by NE(s), to support multi-beam operations in a wireless network can be implemented. FIG. 7 illustrates various components of an example network entity device 700 in which SS transmission, and transmission of the indication of the SS actually transmitted by NEs, to support multi-beam operations in a wireless network can be implemented. In some implementations, user equipment device 600 and network entity device 700 have at least some similar components. Accordingly, for the purposes of brevity, FIG. 6 and FIG. 7 will be described together. Similar components associated with FIG. 6 will be identified as components having a naming convention of "6XX", while components associated with FIG. 7 will be identified as components having a naming convention of "7XX". Conversely, components distinct to each device will be described separately and after the similar components. User equipment device 600 and network entity device 700 can be, or include, many different types of devices capable of implementing SS reception/transmission and/or reception/transmission of the indication of actual transmitted SS in a wireless system to support multi-beam operations in accordance with one or more implementations.

User equipment device 600/network entity device 700 includes communication transceivers 602/communication transceivers 702 that enable wired or wireless communication of device data 604/device data 704, such as received data and transmitted data. While referred to as a transceiver, it is to be appreciated that communication transceivers 602/communication transceivers 702 can additionally include multiple antennas that can be configured differently from one another, or work in concert to generate beam-formed signals. For example, a first antenna can transmit/receive omnidirectional signals, and subsequent antennas transmit/receive beam-formed signals. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant, 4G-compliant, 5G-compliant), wireless metropolitan area network radios compliant with various IEEE 802.16 (WiMAX™) standards, and wired Local Area Network (LAN) Ethernet transceivers.

User equipment device 600/network entity device 700 may also include one or more data input ports 606/data input ports 706 via which any type of data, media content, and/or inputs can be received, such as user-selectable inputs to the device, messages, music, television content, recorded content, and any other type of audio, video, and/or image data received from any content and/or data source. The data input ports may include Universal Serial Bus (USB ports), coaxial cable ports, and other serial or parallel connectors (including internal connectors) for flash memory, Digital Versatile Discs (DVDs), Compact Discs (CDs), and the like. These data input ports may be used to couple the device to any type of components, peripherals, or accessories such as microphones, cameras, and/or modular attachments.

User equipment device 600/network entity device 700 includes a processor system 608/processor system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified as processing and control 610/processing and control 710. User equipment device 600/network entity device 700 may further include any type of a system bus or other data and command transfer system that couples the various components within the device. A system bus can include any one or combination of different bus structures and architectures, as well as control and data lines.

User equipment device 600/network entity device 700 also includes computer-readable storage memory or memory devices 612/memory devices 712 that enable data storage, such as data storage devices that can be accessed by a computing device, and that provide persistent storage of data and executable instructions (e.g., software applications, programs, functions, and the like). Examples of the computer-readable storage memory or memory devices 612/memory devices 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. User equipment device 600/network entity device 700 may also include a mass storage media device.

The computer-readable storage memory provides data storage mechanisms to store the device data 604/device data 704, other types of information and/or data, and various device applications 614/device applications 714 (e.g., software applications). For example, an operating system 616/operating system 716 can be maintained as software instructions with a memory device and executed by the processor system 608/processor system 708. The device applications may also include a device manager, such as any form of a control application, software application, signal-processing and control module, code that is native to a particular device, a hardware abstraction layer for a particular device, and so on. User equipment device 600 includes protocol stack module 618 and synchronization module 620, while network entity device 700 includes protocol stack module 718 and synchronization module 720.

Protocol stack module 618/protocol stack module 718 represent functionality that implements any suitable protocol used to communicate between devices. This can include any suitable combination of information, signals, data packets, message ordering, transmission frequencies, modulation types, and/or handshaking used between communication devices to interpret transmitted data and/or to convey information. Some implantations of protocol stack module 618/protocol stack module 718 implement a protocol stack that follows the OSI model as further described herein. The protocol stack module 618 includes synchronization module 620, while protocol stack module 718 includes synchronization module 720. While illustrated as residing within protocol stack module 618/protocol stack module 718, other implementations of synchronization module 620/synchronization module 720 reside outside its respective protocol stack module such that the synchronization module controls various aspects of transmission, reception, and/or communication synchronization (as well as indication) within the corresponding protocol stack. The synchronization module 620 represents functionality that extracts SS indication information transmitted by one or more NEs, and subsequently locates the indicated SS blocks and/or provides indication of rate-matching around the indicated SS blocks to protocol stack module 618. Synchronization module 720 represents functionality that determines transmission parameters (e.g., time locations, frequency locations, subcarrier spacing, etc.) that are used to transmit SS blocks, generates the appropriate indication messages that include SS transmission location information, generates the data transmitted in an SS block, and/or manages the transmission of the SS blocks.

User equipment device 600 also includes an audio and/or video processing system 622 that generates audio data for an audio system 624 and/or generates display data for a display system 626. The audio system 624 and/or the display system 626 may include any devices that process, display, and/or otherwise render audio, video, display, and/or image data. Display data and audio signals can be communicated to an audio component and/or to a display component via an RF link, S-video link, HDMI (high-definition multimedia interface), composite video link, component video link, DVI (digital video interface), analog audio connection, or other similar communication link, such as media data port 628. In implementations, the audio system and/or the display system are integrated components of the example device. Alternatively, the audio system and/or the display system are external, peripheral components to the example device.

CONCLUSION

Techniques described herein determine positioning of synchronization signal blocks. One or more implementations receive at least one synchronization signal in a synchronization signal block from a first network entity, and an indication from a second network entity. The indication from the second network entity can be used to determine synchronization signal block positioning, such as time location(s). In turn, various implementations communicate with the first network entity based, at least in part, on the determined synchronization signal block(s).

Alternately or additionally, techniques provided herein provide support for multi-beam operations in a wireless network. Some implementations transmit, using a system that includes one or more network entities, at least one synchronization signal in a synchronization signal block with a subcarrier spacing on a synchronization signal frequency in a frequency band to user equipment. At least one implementation transmits, using the system and to the user equipment, an indication that provides transmission location information associated with one or more synchronization signal blocks for each of one or more sets of consecutive synchronization signal slots. In response to transmitting the indication, various implementations communicate with the user equipment based, at least in part, on the one or more synchronization signal blocks and the indication.

Although various aspects of synchronize signal transmission and/or synchronization signal indications have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different implementations are described and it is to be appreciated that each described implementation can be implemented independently or in connection with one or more other described implementations.

We claim:

1. A device comprising:
a transceiver that:
detects at least one synchronization signal in a synchronization signal block transmitted from a first network entity with a subcarrier spacing on a synchronization signal frequency in a frequency band; and
receives, from a second network entity, an indication of at least one synchronization signal block transmitted in a synchronization signal burst set from the first network entity, the indication comprising first information and second information, the first information including a first number of binary bits and the second information including a second number of binary bits, where a total number of binary bits of the indication is less than a number of potential synchronization signal block time locations; and
a processor system that:
determines at least one position of the at least one synchronization signal block in the synchronization signal burst set based on the indication, a value of the subcarrier spacing, and a value of the frequency band; and
directs the transceiver to communicate with the first network entity based on the determined at least one position of the at least one synchronization signal block in the synchronization signal burst set.

2. The device of claim 1, wherein the transceiver receives the indication in a system information burst.

3. The device of claim 2, wherein the transceiver receives the system information burst in a remaining minimum system information (RMSI) received on a Physical Downlink Scheduled Channel (PDSCH).

4. The device of claim 1, wherein the transceiver receives the indication in a dedicated radio resource control (RRC) message.

5. The device of claim 1, wherein the first information comprises information associated with each of at least one set of consecutive synchronization signal slots, each respective synchronization signal slot of the at least one set of consecutive synchronization signal slots including at least one potential synchronization signal block time location, wherein the second information comprises information identifying which of the at least one potential synchronization signal block time location includes a transmitted synchronization signal block.

6. The device of claim 5, wherein the transceiver receives, in the first information, a bitmap, wherein:
each respective bit in the bitmap corresponds to a respective set of consecutive synchronization signal slots of the at least one set of consecutive synchronization signal slots, and
each respective bit in the bitmap indicates the presence of at least one synchronization signal block in the respective set of consecutive synchronization signal slots.

7. The device of claim 5, wherein the second number of binary bits is dependent on at least a number of possible synchronization signal block time locations per set of consecutive synchronization signal slots.

8. The device of claim 5, wherein the first number of binary bits is dependent on the at least one set of consecutive synchronization signal slots.

9. The device of claim 8, wherein the first number of binary bits is equal to a number of sets of consecutive synchronization signal slots.

10. The device of claim 1, wherein
the transceiver receives, in the second information, a number, N, that denotes a number of the at least one synchronization signal block in the synchronization signal burst set; and
wherein the transceiver receives, in the second information indication, a combinatorial index, r,
wherein a maximum number of synchronization signal blocks in the synchronization signal burst set is a number L, and the combinatorial index, r, is given by an equation $$r = \sum_{i=0}^{N-1} \left\{ \begin{matrix} L-k_i \\ N-i \end{matrix} \right\} \text{ and } \left\{ \begin{matrix} x \\ y \end{matrix} \right\} = \begin{cases} \begin{pmatrix} x \\ y \end{pmatrix} & x \geq y \\ 0 & x < y \end{cases}$$

is an extended binomial coefficient, and
wherein $\{k_i\}_{i=0}^{N-1}$, ($1 \leq k_i \leq L$, $k_i < k_{i+1}$) is a set of positions of the N synchronization signal blocks corresponding to synchronization signal block time location indices.

11. The device of claim 1, wherein the first network entity and the second network entity are a same network entity.

12. The device of claim 1, wherein the first network entity and the second network entity are different network entities.

13. The device of claim 1, wherein the first network entity is associated with a secondary cell, and the second network entity is associated with a primary cell.

14. A method comprising:
detecting at least one synchronization signal in a synchronization signal block transmitted from a first network entity with a subcarrier spacing on a synchronization signal frequency in a frequency band;
receiving, from a second network entity, an indication of at least one synchronization signal block transmitted in a synchronization signal burst set from the first network entity, the indication comprising first information and second information, the first information including a first number of binary bits and the second information including a second number of binary bits, where a total number of binary bits of the indication is less than a number of potential synchronization signal block time locations;

determining at least one position of the at least one synchronization signal block in the synchronization signal burst set based on the indication, a value of the subcarrier spacing, and a value of the frequency band; and communicating with the first network entity based on the determined at least one position of the at least one synchronization signal block in the synchronization signal burst set.

15. The method of claim 14, wherein the first information comprises information associated with each of at least one set of consecutive synchronization signal slots, each respective synchronization signal slot of the at least one set of consecutive synchronization signal slots including at least one potential synchronization signal block time location, wherein the second information comprises information identifying which of the at least one potential synchronization signal block time location includes a transmitted synchronization signal block.

16. The method of claim 15, wherein the first information includes a bitmap, wherein:

each respective bit in the bitmap corresponds to a respective set of consecutive synchronization signal slots of the at least one set of consecutive synchronization signal slots, and each respective bit in the bitmap indicates the presence of at least one synchronization signal block in the respective set of consecutive synchronization signal slots.

17. The method of claim 15, wherein the second number of binary bits is dependent on at least a number of possible synchronization signal block time locations per set of consecutive synchronization signal slots.

18. The method of claim 15, wherein the first number of binary bits is dependent on the at least one set of consecutive synchronization signal slots.

19. The method of claim 18, wherein the first number of binary bits is equal to a number of sets of consecutive synchronization signal slots.

20. The method of claim 14, wherein the second information comprises a number, N, that denotes a number of the at least one synchronization signal block in the synchronization signal burst set, and a combinatorial index, r, wherein a maximum number of synchronization signal blocks in the synchronization signal burst set is a number L, and the combinatorial index, r, is given by an equation $$r = \sum_{i=0}^{N-1} \left\{ \begin{matrix} L - k_i \\ N - i \end{matrix} \right\} \text{ and } \left\{ \begin{matrix} x \\ y \end{matrix} \right\} = \begin{cases} \begin{pmatrix} x \\ y \end{pmatrix} & x \geq y \\ 0 & x < y \end{cases}$$

is an extended binomial coefficient, and wherein $\{k_i\}_{i=0}^{N-1}$, ($1 \leq k_i \leq L$, $k_i < k_{i+1}$) is a set of positions of the N synchronization signal blocks corresponding to synchronization signal block time location indices.

* * * * *